3,485,808
METHOD FOR CONTROLLING TEMPERATURE OF AN EXOTHERMIC POLYMERIZATION REACTION
George Leonard Wiesner, Bound Brook, N.J., assignor to American Cyanamid Company, Stamford, Conn., a corporation of Connecticut
No Drawing. Filed Nov. 23, 1966, Ser. No. 596,468
Int. Cl. C08f 1/11, 1/13
U.S. Cl 260—85.5          3 Claims

ABSTRACT OF THE DISCLOSURE

The exotherm which limits the batch size and affects polymer properties in emulsion or suspension batch polymerizations of ethylenically unsaturated monomers such as acrylates, vinyl chloroethyl ether and vinyl chloroacetate, is controlled by a split water addition technique wherein a portion of the monomers and 25–75% of the water normally in the original charge is withheld until an exotherm is noted, the withheld water and monomers then being added in separate streams, the water at a rate effective to minimize temperature change during the monomer addition. By this method the reaction temperature can be controlled to about ±1° C. of the optimum reaction temperature.

---

This invention relates to an improved method of producing elastomers by emulsion or suspension polymerization. More particularly, it relates to an improved method for the production by emulsion or suspension polymerization of those elastomers whose starting monomers produce sufficient exotherms in the polymerization reaction as to present difficulties in temperature control during the polymerization, and more specifically, it relates to an improvement in the process for producing an acrylic copolymer using azobisisobutyronitrile as an initiator wherein improved temperature control is effected.

BACKGROUND OF THE INVENTION

The copolymerization of mixtures of various ethylenically unsaturated monomers is a well-known and highly developed art. There are, in general, three methods by which such copolymers can be made; bulk, suspension, and emulsion polymerizations. The particular method of polymerization will depend upon a number of factors. Generally, bulk polymerizations are difficult to control, lead to low or moderate molecular weight polymers, produce the polymer in an inconvenient form, present difficulties in removal of unreacted monomers, and, in many instances, are not suitable for the particular polymer involved. In order to achieve better control of the polymerization reaction, to produce higher molecular weight polymers, to obtain the polymers in convenient form, and otherwise to overcome deficiencies of bulk polymerizations, recourse is had to emulsion or suspension polymerizations. Generally, the only difference between these last two polymerization techniques is in the amount and/or type of agents employed in effecting emulsion or suspension. Emulsion polymerization produces the elastomer as a stable suspension from which the elastomer must be recovered by coagulation. Suspension polymerization, on the other hand, produces the elastomer in the form of discrete particles in the form of beads of small size. The choice between these two polymerization techniques will depend to some extent upon the final intended use of the polymer formed. Where the polymer is to be used as an elastomer, suspension polymerization is convenient since it produces the polymer in a form readily used. However, emulsion polymerizations can also be employed since the polymers can be coagulated from the emulsion and then separated from such a system for use as an elastomer.

A number of techniques have been employed in suspension or emulsion polymerizations in order to obtain the desired polymers. The variations in technique generally are dictated by the specific comonomers employed and, to some extent, by the nature of the polymer desired. In the simplest case, the monomers are dispersed in an aqueous medium in the presence of suitable emulsifying or suspending agents and the polymerization is initiated and controlled to some extent by the use of various initiators and short-stopping agents. In most cases high molecular weight polymers are obtainable and the polymerization temperature is controllable by the combination of the large amounts of aqueous medium present in the reaction mixture and the use of cooling or heating jackets on the vessel in which the polymerization is conducted. In certain cases where the exotherm is excessive, the use of auxiliary internal coils within the reaction mixture are sometimes employed through which additional cooling medium may be circulated. In most cases, however, where the heat evolved in the polymerization reaction is excessive, particularly where large batch sizes are attempted, the available methods for temperature control are inadequate to conduct such polymerizations within an accurate and precise temperature range, at least during critical periods in the polymerization reaction.

The lack of temperature control in such a polymerization is a serious deficiency for several reasons. First, the nature of the exotherm is generally such as to cause wide changes in conditions in successive polymerizations, reaching various temperature peaks and having variable durations. The effect of these variations is to produce polymers that exhibit varying properties as elastomers from batch to batch. Next, the inability to absorb the heat evolved in the exothermic reaction with cooling jackets can give rise to sufficient temperature increases to cause loss of the emulsion or suspension system, in which case the polymerization procedure reverts, in effect, to a bulk system with the attendant deficiencies previously enumerated. Additionally, undue temperature rise during the polymerization reaction can affect deleteriously the Mooney viscosity of the elastomer, its halogen or other elemental content, its molecular weight distribution, its linear structure, etc.

Up to the present time in attempting to find a solution to the problem of temperature control in exothermic emulsion or suspension polymerizations, recourse is had generally to one of two possible alternatives. In the first, the size of the batch is limited to that which can adequately be controlled in temperature by the cooling jacket of the reactor with available media. This procedure has the deficiency of seriously limiting the capacity of a given reactor, thus increasing production difficulties and expenses for a given elastomer. While some increase in capacity can be achieved by the employment of cooling brines instead of water alone, the increased cost of coolant offsets to a great extent the benefits of increased capacity and the difficulties associated with such use further increase the problems of production. In the second, the provision for an auxiliary internal cooling coil through which additional heat can be absorbed over that absorbed by the cooling jacket alone gives rise to other deficiencies. The effectiveness of the cooling coils is reduced as the reaction proceeds, or at least in subsequent batches, due to the build-up of polymer on the coils, said build-up acting as an insulator against further efficient heat transfer. The task of preventing polymer build-up during polymerization as well as of removing such buildups between batches is a formidable one which often tends to offset any gains potentially realizable through the installation of auxiliary internal cooling coils.

There exists, therefore, the need for improved methods for controlling temperature in emulsion or suspension polymerizations accompanied by excessive exotherms wherein greater yield of product per unit volume of reactor is achieved without the deficiencies of former methods.

THE INVENTION

It has now been discovered that by withholding part of the aqueous medium employed in emulsion or suspension polymerization until such time as temperature rise is exhibited as a result of the exothermic reaction involved and then adding such withheld water in conjunction with cooling medium in the reactor jacket, highly efficient temperature control of the reaction can be maintained while still utilizing said reactor at considerably increased capacities. In this manner temperature control to within about plus or minus one degree centigrade of the optimum temperature for a particular system can be achieved. It is surprising that this method of temperature control should be so effective in view of the relatively small quantity of water added to the batch in a given time period compared with the large quantity of water circulated through the cooling jacket and, in appropriate cases, auxiliary internal coils without approaching effectiveness in the latter cases. It is also surprising that the present method is not detrimental to the batch in view of the initial shortage of aqueous medium therein. Further, it is surprising that the elastomers produced by the present method are generally superior in physical properties to those of the former methods in spite of the initial shortage of aqueous medium.

In the usual methods of polymerization by emulsion or suspension techniques, using an initiator the total aqueous charge containing appropriate dispersing agents is placed in the reactor, maintained under agitation and brought to the reaction temperature by heating. Then addition is made of suitable amounts of activated monomers. Feed of additional monomers in the desired ratios is then made while circulating cooling medium through the jacket of the reactor. After addition of the monomers is complete, the reaction is generally warmed slightly and reacted for an additional time period to minimize content of unreacted monomer, then cooled. Where the process involves a suspension, the product is generally separated at this time, washed and dried. Where the process involves an emulsion, the product may be stored as such or the elastomer may be recovered by coagulation of the emulsion, then washing and drying.

According to the present invention, the method of emulsion or suspension polymerization is generally that normally employed except that part of the initial water charge is withheld. The usual procedure described above is followed except for the water charge through the addition of activated monomers. During the feed of additional monomers provision is made for the regulated addition of the withheld water in amounts necessary to control temperature at the specific value desired in conjunction with cooling medium in the reactor jacket. Then, after the feed of additional monomers and withheld water is complete, the usual procedure as described above is resumed.

The monomers or comonomers that may be employed in the process of the present invention are, in general, those normally employed in emulsion or suspension polymerizations except for the obvious provision that in the polymerization reaction the heat liberated should be beyond the normal capacity of cooling jackets of the conventional reactors to handle at full operating capacity of the reactor. Thus, while the process of the present invention may be employed in any emulsion or suspension polymerization, its advantages are generally not apparent unless the problem of temperature control arises. Among the monomers with which the process of the present invention is especially suitable in both homo- and copolymerizations are included the acrylates in general as well as acrylonitrile, cyanoethyl acrylate, 2-chloroacrylate, vinyl chloroethyl ether, vinyl α-haloacrylates in general, vinyl chloroacetate, styrene, etc.

The initiators employed in the polymerization procedure are those normally employed in the usual procedures and at the same use level. Since the process of the present invention is not critically dependent upon any specific initiator or manner of use thereof, wide variations in the choice and method of use of initiators is possible while still achieving the benefits of the process of the present invention. Initiators that may be employed successfully in the process of the present invention include preferably the class represented by azobis (isobutyronitrile) and more fully described in U.S. Patent No. 2,471,959; potassium persulfate, lauroyl peroxide, redox systems such as persulfate-bisulfite, peroxide-amine, ceric ammonium nitrate-polyvinyl alcohol, etc. The initiator may be added to the monomer charge separately, the resulting mixture warmed to activate, and then the mixture added to the reactor containing water and dispersants. Alternatively, the initiator may be added to the monomer charge in the presence of water and dispersants as a single addition to start the reaction or it may be added in portions throughout the course of the polymerization. Certain other variations in the method of use of initiators as are known may also be employed.

The method of addition of monomer or comonomers to the reaction mixture also follows conventional procedures. Generally a portion of the total monomer charge is added initially to the aqueous medium and then increments of additional monomer are added as the polymerization reaction is in progress. This procedure applies to both homo- and copolymerizations. However, in copolymerizations, the relative ratio of monomers added in the charge and in the feed is dependent upon the relative reactivities of the specific monomers involved. Thus, the slower reacting monomer is charged in greater proportion of its total presence in the charge and in smaller proportion in the feed while the reverse is true for the fast-reacting comonomers.

It is to be understood that the presence of oxygen is detrimental to the desired polymerization reactions, as in typical procedures. Accordingly, use of nitrogen purges in the monomers, in the initiating mixture, and in the reaction mixture will follow conventional procedures. Other inert gases may be used in place of nitrogen in the purges as in conventional procedures.

The amount of water normally present in the charge is dictated by the total solids of polymer desired in the final reaction mixture. In the process of the present invention the final total solids desired also dictates the total amount of water employed in the reaction mixture, but only a part of this water is included in the charge. The amount of water withheld from the charge should be that quantity which in combination with cooling medium in the reactor jacket will prevent temperature rise during the reaction. The amount of water withheld will be influenced to some extent by the total amount to be employed in the reaction as well as the heat-liberating tendencies of the reactants involved. Thus, the amount of water withheld may vary, in general, from about 25% to about 75% of the total amount to be employed in the reaction mixture and preferably is between about 50 and 75% on the same basis.

The rate of addition of withheld water to the reaction mixture as dictated by heat evolution therein should be such as to prevent undue temperature rise. However, since it is usually desirable to maintain the reaction temperature between precise limits, the rate of addition of withheld water should also be such as to prevent any large temperature change, thus indicating the undesirability of too rapid additions thereof. The rate of water addition will primarily be dictated by the rate of heat evolution in the reaction mixture, which, in turn, will be influenced by the nature of the reactants, i.e. their heats of reaction, the rate of monomer feed, the efficiency of the cooling jacket of the reactor, the temperature at which it is desired to run the reaction, etc. Thus, the rate of water addition may vary due to these influences. Also, the rate of heat evolution in the reaction mixture is usually more rapid in the early stages of monomer addition than in later stages. While it is possible to obtain reasonably good temperature control of the reaction mixture by a single steady rate of addition of water throughout most of the monomer feed cycle, it is generally preferable to change rates of water addition at appropriate points in order to obtain more precise temperature control. Thus, during certain periods of high heat evolution from the polymerization reaction the rates of water addition used may be two or more times the average rate, i.e., $$\text{average rate} = \frac{\text{total amount of water withheld}}{\text{total monomer feed time}}$$

After completion of the monomer feed and water addition, the process of the present invention reverts to conventional procedures. The option of additional reaction at slightly elevated temperature may be exercised if desired, and the subsequent steps of isolation, washing, and drying of the polymer are as in conventional procedures.

The polymers produced according to the process of the present invention have a variety of uses, depending upon the particular monomer or comonomers employed in the process. Of particular interest are those copolymers based on a major portion of an acrylate and a minor portion of a halogen-containing comonomer copolymerizable therewith which have elastomeric properties. These elastomers because of their outstanding chemical resistance are especially useful in the making of oil-resistant molded products, such as O rings, oil seals, gaskets, pump membranes, etc., where the molded products are obtained through normal vulcanization procedures.

The invention is more fully illustrated by the examples which follow.

Example 1

In this example, a polymer consisting essentially of ethyl acrylate with minor amounts of a vinyl co-monomer is produced by a suspension polymerization technique. The reaction is carried out in a 1000 gal. glass-lined kettle, similar to that produced by the Pfaudler Co., Inc. The reaction is maintained at about 80° C.±1.00° C. The free radical initiator, azobisisobutyronitrile, is used at an initiator monomer concentration of about 0.05%.

In this case, heat of reaction is removed by transfer to water in the cooling jacket only. By calculation, it can be shown that the maximum monomer loading per batch is obtained when the suspension slurry is initially about 900–950 gallons in volume. About 25% of the total monomers are added quickly to the suspension. The remaining 75% of the monomers are fed at a steady rate for a period of one hour. It can be calculated that the maximum monomer loading is limited to about 500–530 pounds per batch. Minimum water to monomer ratio can be calculated to be about 14.2 to 15.8 to 1. This is a very high water to monomer loading where hydrolysis of polymers may be a problem.

This example illustrates the limitations of the batch size when temperature control is maintained by the cooling jacket alone.

Example 2

In this example a polymer consisting essentially of ethyl acrylate with minor amounts of a vinyl co-monomer is produced by suspension polymerization. The reaction is carried out in a 1000 gal. glass-lined kettle similar to that used in Example 1. The reaction is maintained 80°±1° C. The free radical initiator, azobisisobutyronitrile, is used at an initiator to monomer concentration of about 0.05%.

Initially about 25% of the total water for the slurry is added to the batch. About 25% of the total monomers are added quickly to the batch in a fashion such that the polymerization starts at about 80° C. The remaining 75% of the monomers is added to the batch at a steady rate over a period of one hour. Heat generated by the reaction is removed by transfer to the jacket and by dissipation through controlled addition of 30° C. water directly to the batch. As the heat generated reaches a maximum, the bulk of the heat is so dissipated by water added internally. It can be calculated that, by using the technique described, a monomer loading of 2000 to 2300 pounds per batch can be used. In addition, it can be calculated that the water:monomer ratio can be controlled to a maximum of about 2.6 to 2.8 to 1.

Example 2 illustrates the significantly increased batch size obtainable by the process of the present invention; additionally, it illustrates the significant reduction in the water to monomer ratio throughout the reaction cycle.

Example 3

In this example a polymer similar to that in Example 2 is made except that the process of Example 1 is used. The monomer system boils at temperature of about 86° C. It can be calculated that maximum heat evolution begins about 7 minutes after the start of the addition of the remaining 75% of monomer feed. It can be calculated further that, using only the cooling jacket to dissipate heat evolved, the boiling point of the monomer system will be attained in about 4–5 minutes later, at which time only about 20% of the remaining monomer will have been introduced into the system. This will result in loss of the batch, and this is further illustration of the serious limitation on batch size which the conventional process imposes.

I claim:

1. In an exothermic aqueous emulsion or suspension batch polymerization of ethylenically unsaturated monomers carried out in the presence of an emulsifier or a dispersant, respectively, an initiator and in a reaction vessel having external cooling means and separate water and monomer feed streams, the improvement which comprises (a) withholding water and monomers from the original charge, the amount of withheld water being from about 25 to 75% of said charge, (b) continuing the polymerization reaction until a temperature rise is noted, and (c) thereafter adding said withheld water and monomers, the withheld water being added at a rate effective to minimize temperature change during said monomer addition.

2. A process according to claim 1 where the initiator employed is azobisisobutyronitrile.

3. The process of claim 1 wherein the monomers are selected from acrylates, acrylonitrile, vinyl chloroethyl ether, vinyl chloroacetate, styrene, and mixtures thereof.

References Cited

UNITED STATES PATENTS

| 2,978,441 | 4/1961  | Sherk.               |
|-----------|---------|----------------------|
| 3,172,880 | 3/1965  | Lupfer.              |
| 3,254,071 | 5/1966  | Morgan et al.        |
| 3,293,199 | 12/1966 | Abercrombie.         |
| 3,306,888 | 2/1967  | Mortimer _____ 260—89.5 |
| 3,325,453 | 6/1967  | Lim et al.           |
| 3,372,151 | 3/1968  | Scanley.             |

HARRY WONG, JR., Primary Examiner

U.S. Cl. X.R.

260—80.3, 86.1, 86.7, 87.3, 88.1, 88.7, 89.1, 89.5, 91.1, 93.5

UNITED STATES PATENT OFFICE
CERTIFICATE OF CORRECTION

Patent No. 3,485,808 December 23, 196

George Leonard Wiesner

It is certified that error appears in the above identified patent and that said Letters Patent are hereby corrected as shown below:

In the heading to the printed specification, line 7, "a corporation of Connecticut" should read -- a corporation of Maine--.

Signed and sealed this 22nd day of December 1970.

(SEAL)
Attest:

Edward M. Fletcher, Jr.
Attesting Officer

WILLIAM E. SCHUYLER, JR.
Commissioner of Patents